United States Patent
Krank et al.

(10) Patent No.: US 12,140,423 B2
(45) Date of Patent: Nov. 12, 2024

(54) TRANSPORT DEVICE HAVING AT LEAST ONE CHAIN

(71) Applicant: BÜHLER GMBH, Reischshof (DE)

(72) Inventors: Christoph Krank, Ichikawa (JP); Christoph Klör, Wenden (DE)

(73) Assignee: Bühler Gmbh, Reichshof (DE)

( * ) Notice: Subject to any disclaimer, the term of this patent is extended or adjusted under 35 U.S.C. 154(b) by 22 days.

(21) Appl. No.: 17/998,074

(22) PCT Filed: Apr. 22, 2021

(86) PCT No.: PCT/EP2021/060470
§ 371 (c)(1),
(2) Date: Nov. 7, 2022

(87) PCT Pub. No.: WO2021/224012
PCT Pub. Date: Nov. 11, 2021

(65) Prior Publication Data
US 2023/0175829 A1    Jun. 8, 2023

(30) Foreign Application Priority Data
May 8, 2020   (EP) .................................... 20173731

(51) Int. Cl.
B65G 17/00        (2006.01)
G01B 7/04         (2006.01)
G05B 19/4155      (2006.01)

(52) U.S. Cl.
CPC .............. G01B 7/042 (2013.01); B65G 17/00 (2013.01); G05B 19/4155 (2013.01);
(Continued)

(58) Field of Classification Search
CPC ................. G01B 7/042; G01B 11/043; G01M 13/023; B65G 17/00; B65G 2207/48;
(Continued)

(56) References Cited

U.S. PATENT DOCUMENTS 5,490,590 A     2/1996  Courtney
9,730,456 B2 *  8/2017  Domenicucci ........... A21B 3/00
(Continued)

FOREIGN PATENT DOCUMENTS

DE    10 2017 119 301 A1    2/2019
EP       2 710 321 A1        3/2014
(Continued)

OTHER PUBLICATIONS

International Search Report Corresponding to PCT/EP2021/060470 mailed Jun. 8, 2021.
Written Opinion Corresponding to PCT/EP2021/060470 mailed Jun. 8, 2021.

*Primary Examiner* — James R Bidwell
*Assistant Examiner* — Muhammad Awais
(74) *Attorney, Agent, or Firm* — Finch & Maloney PLLC

(57) ABSTRACT

The invention relates to a transport device (100), in particular for transporting product carriers in a plant for manufacturing food products. The transport device (100) comprises at least one chain (1) to which measuring marks (4) are attached, an electrical drive system (20) for driving the chain (1) with a servo motor (25) and an absolute encoder (21), a plant control unit (30) and a measuring sensor (11) for detecting the measuring marks (4) with a switching frequency of greater than 2000/s. The plant control unit (30) comprises a first input (34) for receiving measurement data from the measuring sensor (11) and a second input (35) for receiving position data from the position sensor (21) and is designed to receive data from the measuring sensor (11) and from the position sensor (21), to mutually correlate said data correctly with respect to time, to determine therefrom lengths between measurement marks (4), more particularly between two consecutive measurement marks, and to produce a signal which provides information about the quality of the chain. A servo position actual value is ascertained by means of oversampling.
(FIG. 2)

19 Claims, 3 Drawing Sheets

(52) U.S. Cl.
CPC ............... *B65G 2203/0283* (2013.01); *B65G 2207/48* (2013.01); *G05B 2219/34013* (2013.01)

(58) Field of Classification Search
CPC .... B65G 2203/0283; B65G 2203/0216; B65G 2203/02; B65G 2203/042; B65G 15/30; B65G 23/02; G05B 19/4065; G05B 2219/37252; G05B 19/4155; G05B 2219/34013; Y02P 90/02
USPC ........................................... 198/502.1, 688.1
See application file for complete search history.

(56) References Cited

U.S. PATENT DOCUMENTS

| | | | |
|---|---|---|---|
| 10,753,813 B1 * | 8/2020 | Stork | G01M 13/023 |
| 2011/0093218 A1 * | 4/2011 | Vozner | G01B 11/043 |
| | | | 356/429 |
| 2019/0062067 A1 * | 2/2019 | Kreisfeld | G01B 11/043 |
| 2019/0368862 A1 * | 12/2019 | Murray | B65G 15/30 |

FOREIGN PATENT DOCUMENTS

| | | | | |
|---|---|---|---|---|
| EP | 3 167 267 | A2 | 5/2017 | |
| EP | 3196625 | A1 * | 7/2017 | |
| EP | 3167267 | B1 * | 4/2020 | ............ B65G 43/02 |
| GB | 2 406 844 | A | 4/2005 | |
| WO | 2017220281 | A1 | 12/2017 | |

\* cited by examiner

TRANSPORT DEVICE HAVING AT LEAST ONE CHAIN

FIELD OF THE INVENTION

The invention relates to a transport device with at least one chain, in particular for the transport of product carriers in a plant for the production of food products, a plant for the production of a food product, a method for determining lengths of segments of a chain as well as a computer program product.

BACKGROUND OF THE INVENTION

Chain conveyors are used in a variety of industrial applications for drive and/or transport purposes.

In plants for the production of food products, transport devices with chains are used to transport product carriers, in particular molds, from process station to process station. Often several, preferably two, chain strands are used. The transport device can use chain strands that are up to several hundred meters long or be combined from partial transport devices with chain strands that are still 20 to 70 meters long. The chains are usually in the form of endless circulating chains running over deflection and drive sprockets.

A transport device typically consists of one or more chains to which carriers are attached for driving a product or product carrier, a drive element, a compensating element for influencing the chain tension, and sprockets for deflection.

The quality of the conveyor is influenced, for example, by the chain tension, the chain standstill position, the quality of the carriers, the parallelism of chains, the length of the entire chain and the length of chain segments.

A chain typically consists of a plurality of chain links connected by pins that pass through overlapping openings in adjacent chain links.

Over a period of use, a chain is subject to wear due to friction between adjacent links and between the pins and the links.

The rate of wear of a chain depends on the type of conveyor in which it is installed, the loads to which it is subjected, the speed at which it is operated, the lubrication it receives, and the environment and environmental conditions in which it operates.

This wear leads to elongation of the chain and consequently to a reduction in the quality of the conveyor. Eventually, the chain must be replaced to prevent a malfunction or failure of the transport device.

Typically, the chains are subjected to regular visual inspection. However, even minor changes in length can lead to an impairment of the processes. Since chain wear can neither be avoided nor predetermined, automated and, if possible, continuous monitoring is desirable.

From EP2710321B1 a device with a measuring device for measuring an elongation of the chain is known, which has two signal sensors, which are arranged at a distance from each other.

DE 10 2017 119 301 A1 discloses a sensor device for determining segments of a chain, comprising a sensor adapted to acquire measurement data for determining the position of a segment of the chain and comprising a sensor adapted to acquire measurement data for determining the length values of a segment of the chain.

U.S. Pat. No. 5,490,590 describes a chain wear monitor having a wheel that is brought into frictional engagement with the chain. The rotational movement of the shaft of the wheel is converted into an electrical signal that is sent to a controller for processing. At the same time, the presence of each warp link is detected by a sensor as it passes a predetermined point. The sensor generates a signal that is also forwarded to the controller. The controller calculates a length from the signals. This arrangement is susceptible to inaccuracies caused by relative slippage between the friction wheel and the chain.

All known sensor devices must be integrated into the transport device as an external unit. It may be necessary to open the chain and/or to mount special sensors on the chain. A suitable mounting location must be found for the measurement and accessibility. The mounting is rather complex. An operator must read the information at each individual measuring station.

For automated monitoring, it must be possible to connect the sensor device to the plant control system, and the sensor device thus requires the appropriate interfaces.

US 2011/0093218 A1 discloses a system for monitoring the wear of a chain, whereby three detectors are used to detect different areas of chain links. By means of a control unit, the signals from the detectors are processed and distances from characteristic sections of the chain links are determined. A marker can be used to determine when the chain has completed a full run.

EP 3 167 267 A2 shows a device for measuring a chain length with two sensors, each connected to clocks. The degree of wear of the chain can be determined from the distance of the sensors and the times measured by the two clocks.

EP 3 196 625 A1 shows a system for monitoring chain wear, with two sensors directed at characteristic areas of the chain. From the comparison of the measured data and the time dependence of the measured data, a wear of the chain can be determined.

GB 2 406 844 discloses a system for monitoring a chain elongation. Two marks are attached to a chain, which are detected by two sensors. A control unit calculates the speed of the chain from the times that elapse while the corresponding measuring marks travel the distance between the sensors. From this, the distances of the measuring mark can be inferred and the wear of the chain.

WO 2017/220281 A1 shows the monitoring of the elongation of a transport element, wherein a drive unit has a rotary encoder and a control unit is connected to the rotary encoder and to a sensor in such a way that an elongation of the transport element can be calculated by means of the data of the rotary encoder and of the sensor.

SUMMARY OF THE INVENTION

The invention is based on the task of overcoming the disadvantages of the prior art and, in particular, of providing a transport device, a plant for the production of a food product, a method for determining the lengths of segments of a chain and a computer program product which permit precise length measurement and simple handling.

The task is solved by a transport device having the features of the independent claim(s).

The transport device, in particular for transporting product carriers in a plant for the production of food products, comprises at least one chain to which measuring marks are attached.

Preferably, the transport device comprises two chains arranged parallel to each other. The product carriers are preferably mold trays in which, for example, a fat-based mass such as chocolate is poured.

The product carriers are pulled along by the chain or pushed off the chain by means of carriers. Preferably, the carriers, which can be designed as an attachment, for example as a chain nose, carrier plate or pin, serve as measuring marks.

The transport device further comprises an electric drive system for driving the at least one chain with an electric motor, for example a servo motor, and a position sensor, in particular an absolute encoder.

The chain is typically designed as an endless circulating chain which runs over at least one drive wheel and at least one guide wheel. In addition, a compensating element is usually provided to influence the chain tension, for example a tensioning wheel, which can be mounted on a threaded rod or which can be controlled by a pneumatic cylinder.

The drive system can act as a pulling or pushing drive, with, for example, the electric drive system, in particular a servo drive, and the chain tensioner being arranged spatially adjacent to or spatially separate from one another. The part of the chain section that serves to transport the product carriers is called the load strand, while the returning chain section is called the idle strand.

The transport device has a plant control unit. This is used to control the transport device. The plant control unit can also be a central control unit for controlling all elements of a system for producing food products.

The transport device also has a measuring sensor for detecting the measuring marks. The measuring sensor is preferably arranged close to the chain and at the greatest possible distance from the drive wheel.

According to the invention, the plant control unit comprises a first input for receiving measurement data from the measuring sensor and a second input for receiving position data from the position sensor. The plant control unit is designed to receive data from the measuring sensor and from the position sensor, to mutually correlate said data correctly with respect to time and to use them to determine lengths between, in particular, two consecutive measuring marks.

Position data from the position sensor indicate at any time in which revolution and in which position within the revolution the motor is located, from which the exact position of the chain can be concluded.

Since the chain links assume a defined position on the drive wheel, the difference in the position data corresponds to a roll-off distance of the chain links on the drive wheel and thus to the length of a chain segment. Thus, if the position data are temporally assigned to the measurement data, lengths between measurement marks can be determined.

In particular, if measuring marks regularly applied to the chain are used, for example the carriers, the device is not limited to detecting the lengths of specific chain segments, but any sections of the chain between measuring marks and also the total length of the chain can be checked.

The system control takes over the length determination. The measurement takes place within the existing control architecture and an autonomous measuring device is not required. This eliminates the interfaces that would otherwise be necessary.

Preferably, mainly components are used for the measurement that are already present on a transport device anyway, namely the electric drive and the carriers, only a measuring sensor is added.

The measuring sensor can be an inductive or optoelectronic sensor.

Preferably, the measuring sensor provides a data change when its environment changes. This can happen when an object, namely a part of a measuring mark, enters the measuring field or when an object, namely a part of a measuring mark, exits the measuring field.

The switching distance and switching frequency are important for the measuring precision. Preferably, sensors with a switching frequency greater than 2000/s are selected.

With inductive proximity switches, the switching frequency can decrease as the distance increases. It must therefore be ensured that the measuring marks are at a defined distance from the inductive sensor. For this purpose, the transport device can have a guide rail in the area of the sensor, with which the chain and thus the measuring marks are kept at a defined distance from the sensor.

Optoelectronic sensors can be susceptible to dust and dirt, but are robust to changes in distance. Conceivable is the use of a forked light barrier, i.e. a through-beam sensor, or the use of a reflection measurement with a red light LED or a laser.

In an advantageous embodiment of the transport device, the at least one chain comprises at least one reference measurement mark. In particular, the reference measuring mark is a measuring mark with a geometry that differs from the other measuring marks. Depending on the type of measuring sensor, the reference measurement mark may also have an electromagnetic property or reflectivity that differs from the other measurement marks. The measurement signal generated by a reference mark differs from the measurement signal of the other measurement marks.

The geometry of the measuring mark results in a specific measuring pattern, so that a reference measuring mark with a different geometry can be distinguished from the other measuring marks. Lengths determined by the system control can thus be clearly assigned to distances to the reference mark and thus to specific sections of the chain.

Carriers are usually designed as chain noses with trapezoidal or triangular geometry. If the carriers are used as measuring marks, a reference measuring mark can, for example, have a hole or a different base width than the other carriers.

Preferably, the plant control unit is designed to synchronize received data with a system clock, in particular the bus clock.

In addition to the input for the measurement data, the input for the position data and preferably the electric drive system, in particular a servo drive, are also synchronized or controlled to this clock. This allows both pieces of information to be linked and an exact result to be obtained.

In particular, the result is independent of a cycle time of the other elements for the production of food products, which can also be operated by the plant control system. While the plant cycle runs in an endless loop, the acyclic control part is sheared off in the plant cycle.

Preferably, the plant control unit has a plant clock generator. The clock generator is provided by the plant control unit, for example in the form of the Profinet-IRT bus clock.

Preferably, the transport device has a clock-synchronous bus system for synchronizing the plant control unit and the electric drive system and/or for synchronizing the plant control unit and the incoming measurement data.

In an advantageous embodiment of the transport device, the transport device has a processor unit for data preprocessing, which has an input for data acquired by the measuring sensor and an output for passing the data on to the plant control unit, in particular by means of the clock-synchronous bus system.

The processor unit serves, for example, as an input card for the plant control unit. This input card can be synchronized to the clock and preferably also has an oversampling function.

Oversampling is the acquisition of data in time-equidistant subclocks, where a certain number of subclocks corresponds to a bus clock, for example a Profinet bus clock. The duration of the subclock is the sampling interval.

For example, a bus clock of 4 ms duration and a sampling rate of 32 results in a sampling interval of 125 μs.

Typically, a smallest bus clock of 250 μs can be set, which leads to a resolution of 7.8125 μs at a sampling rate of 32.

The electrical drive system can be designed so that the chain can be moved by 31.25 μm within a sampling interval of 125 μs, and by 1.95 μm within a sampling interval of 7.8125 μs.

Thus, a change in length can be detected with high precision if a time deviation is detected in the acquisition of the measurement signals.

For oversampling a special HighSpeed input card is required. The address assignment for oversampling differs from the normal input assignment. An 8 channel input card occupies 32 Byte in total. Adjustable oversampling factors are 1 to 32, whereby factor 1 leads to no effect but reproduces the bus clock. With activated oversampling each input is represented with 32 bits. From the bit position in the input double word the subclock of the signal change at the input can be determined unambiguously. If less than 32 subclocks are required, the unused bits of the input map can be filled with zero.

The corresponding position of the drive, for example the corresponding servo position actual value, can then be assigned exactly in time by the system control.

A time-accurate assignment consists of determining a servo position actual value at the time of a specific measurement event, which is recorded with the data from the measuring sensor.

For example, the data from the measuring sensor is acquired showing a signal change during a bus clock, at the beginning of which at a time t1 the servo position has a first value $P_{t1}$. At the end of this bus clock at a time t2 the servo position has a second value $P_{t2}$. The servo positions at times t1 and t2 are recorded with the data from the position sensor.

The servo position actual value $P_x$ at the time when the signal change is detected in a particular subclock can be determined by interpolation, especially linear interpolation.

For example, the following relation can be used:

$$P_x = (P_{t2} - P_{t1}) * (X_{pos} - 1)/OVS + P_{t1} \text{ [mm]}.$$

Here $P_x$ is the servo position actual value to be determined, $P_{t1}$ is the servo position at time t1 at a specific bus clock, $P_{t2}$ is the servo position at time t2 at a subsequent bus clock, $X_{pos}$ is the subclock at which a signal change from 0 to 1 occurs.

This means that the signal changes recorded in the measurement data can be assigned very precisely to a specific servo position actual value.

The oversampling achieves an accuracy that is higher than would be possible with the bus clock, depending on the oversampling factor set.

The signal changes to be considered relevant can now be considered, for example those where the signal change is generated by an incoming measurement mark. For example, a light or sound signal can be interrupted by an incoming measurement mark. From the distance of the servo position actual values, which are determined at such signal changes considered as relevant, the chain quality can be concluded.

If the distance between the servo position actual values remains constant, the length of the chain has not changed.

If the chain is elongated, the time interval between the relevant signal changes increases. From the corresponding distance of the servo position actual values, the size of the elongation can be concluded.

In an advantageous embodiment of the transport device, the plant control unit is designed to store raw data. For this purpose, the plant control unit can have and/or access a non-volatile memory so that the data can be used for further calculations.

In the new state of the plant or after a chain change, the current data can be stored as reference data.

In particular, the plant control unit is designed to determine measurement events from measurement data. The measurement data usually show a signal change in a certain subclock. The pattern sequence of signal changes can be used to infer a measurement event. Depending on the measurement mark and sensor, for example, two signal changes occurring at a certain time interval can indicate the passing of a measurement mark. Four signal changes occurring at certain time intervals can, for example, indicate the passing of a measuring mark with a hole, i.e. a reference mark.

A measurement event can therefore be, for example, the passing of a measurement mark or a reference mark at the sensor.

The time of the first signal change of a measured pattern typical for the measurement event can then be associated with the corresponding position data and the plant control unit can, for example, determine a corresponding actual servo position value as described above.

In particular, the plant control unit is designed to determine lengths between measurement events, for example between signal changes that occur in succession and are to be considered relevant.

The difference between two servo position actual values belonging to successive servo position actual values is for example a measure for the chain length between corresponding consecutive measurement marks.

In the same way, the length between reference mark and measurement marks and/or the length between two measurements of the same reference mark can be made.

Alternatively or additionally, the plant control unit is designed to detect changes in lengths between measurement events. The plant control unit can store acquired servo position actual values or lengths, compare them with values or lengths acquired later and/or analyze progressions of acquired values or lengths.

The plant control unit can also compare acquired values or lengths with reference values.

Alternatively or additionally, the plant control unit is adapted to generate a signal that provides information about the quality of the chain.

Recommendations for the operating or maintenance personnel can be derived from the comparison of currently recorded measurement results with reference data. This not only concerns the total length of the chain, but also the length of individual sections or segments.

The plant control unit can generate a signal if, for example, the total length of the chain has increased by more than 3%.

The plant control unit can generate a signal if the course of the chain length increase shows a jump.

The signal may be a visual or audible warning signal, or a message that is transmitted in the form of data to a display unit, for example a monitor.

Depending on the signal, an operator can decide whether the chain needs to be replaced, shortened or lubricated, or whether the chain tension needs to be adjusted differently. The plant control unit may be designed to generate and display a corresponding suggestion.

In an advantageous embodiment of the transport device, the plant control unit comprises at least one output adapted to forward data, in particular to a display unit and/or a cloud.

Data about the quality of the chain can be forwarded to a central cloud platform on which all the plant data is monitored. Maintenance can be recommended to the operator by the cloud platform and, if necessary, a new chain can be offered.

In an advantageous embodiment of the transport device, the plant control unit has at least one further input for receiving further data. Via this input, an operator can enter data, for example, when a new chain has been mounted or when the chain tension has been readjusted.

Advantageously, the electric drive system has an actuator with an interface for data exchange with the plant control unit, in particular a frequency converter. This can be used for synchronization to the same plant cycle.

The task is further solved by a plant for the production of a food product comprising at least one transport device as described above. The plant typically comprises processing stations past which the product carriers are guided, for example a pouring machine, a jogging station, a cold stamping device, a lidding device, a decorating station and/or a cooling station.

The task is further solved by a method for determining lengths of segments of a chain driven by means of an electric drive, in particular in a transport device as described above.

A measuring sensor detects measuring marks, in particular carriers, attached to the chain. The data detected by the measuring sensor and the data sent by a position sensor of the electric drive are assigned to each other in correct time. Data acquired by the measuring sensor and data sent by an absolute encoder of a servomotor that drives the chain are assigned to each other in the correct time.

This can be done by synchronizing a system controller with both the electric drive and the measuring sensor to the same clock.

The servo position actual value is determined by oversampling.

The above mentioned relation $$P_x = (P_{t2} - P_{t1}) * (X_{pos} - 1)/OVS + P_{t1} \text{ [mm]}$$

can be used.

From the data acquired by the measuring sensor and the correlated data of the position sensor, lengths between, in particular, two consecutive measuring marks are determined.

A signal is generated which provides information about the quality of the chain.

Preferably, the method comprises the steps of storing raw data, determining measurement events from measurement data, determining lengths between measurement events, and/or detecting changes in lengths between measurement events.

In particular, a plant control unit synchronizes measurement data acquired by the measuring sensor and data transmitted by a position sensor of the electric drive by means of a clock-synchronous bus connection.

The task is further solved by a computer program product comprising instructions which, when the program is executed by a computer, cause the computer to perform the steps of the method described above.

The program is preferably executed on the PLC of a plant control unit.

BRIEF DESCRIPTION OF THE DRAWINGS

The invention is explained below in embodiment examples based on drawings.

They show
FIG. 1 a part of a transport device in perspective view.

DETAILED DESCRIPTION OF THE PREFERRED EMBODIMENTS

Figure 1:
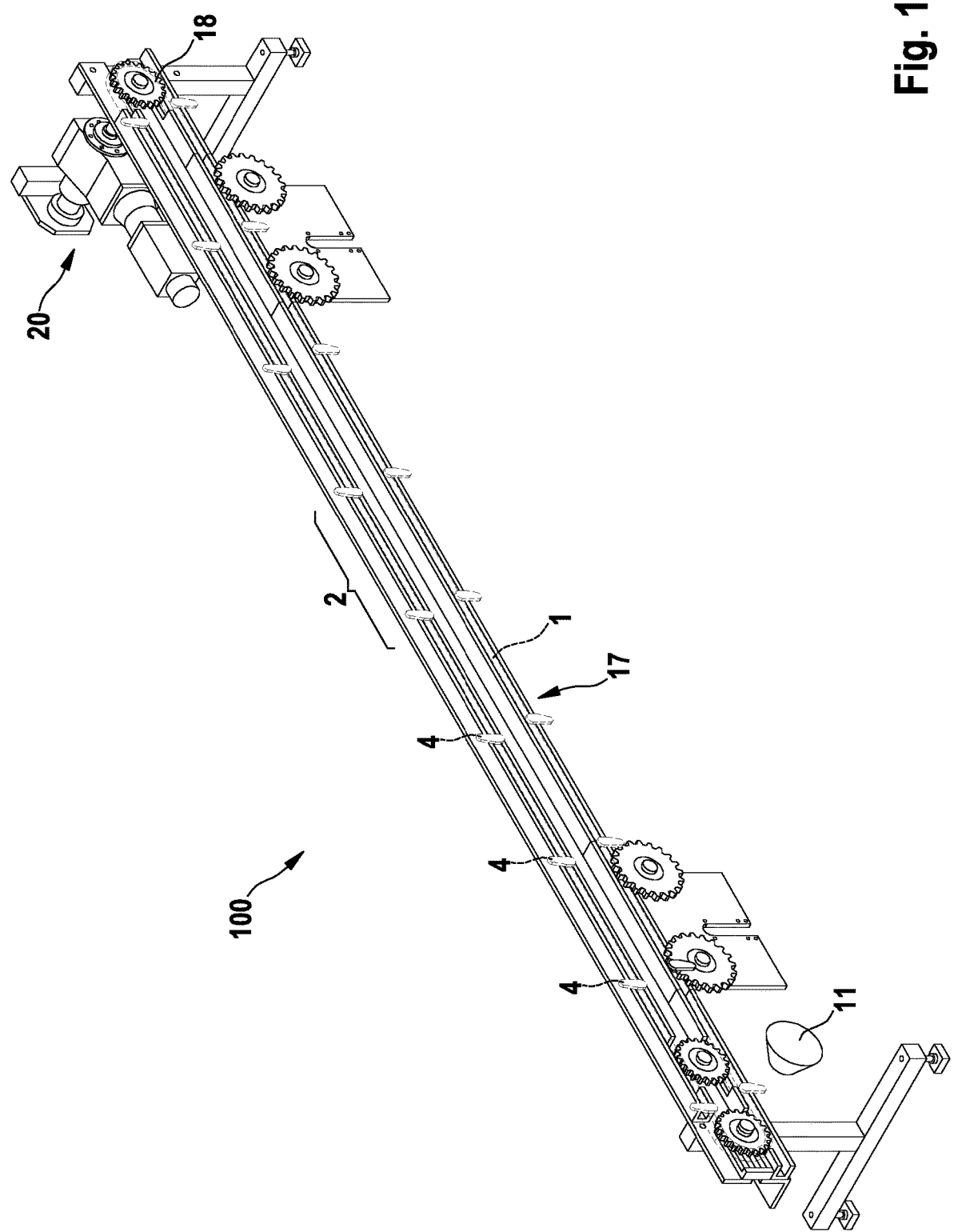

FIG. 1 shows a part of a transport device 100 in perspective view.

The transport device 100 comprises a chain 1, to which measuring marks 4 are attached at regular intervals, and an electric drive system 20 for driving the chain 1. A section of the chain, in particular the section of the chain between two measuring marks 4, is called segment 2.

A measuring sensor 11 is mounted as far as possible from the electric drive system 20. With a measurement of the chain on the drive wheel 18 or in the immediate vicinity of the drive wheel 18, no or hardly any change in position could be detected, since the links of the chain 1 are forced onto the pinions of the drive wheel 18 and therefore maintain a defined distance there.

The measuring sensor 11 can be directed towards the empty run 17.

Figure 2:
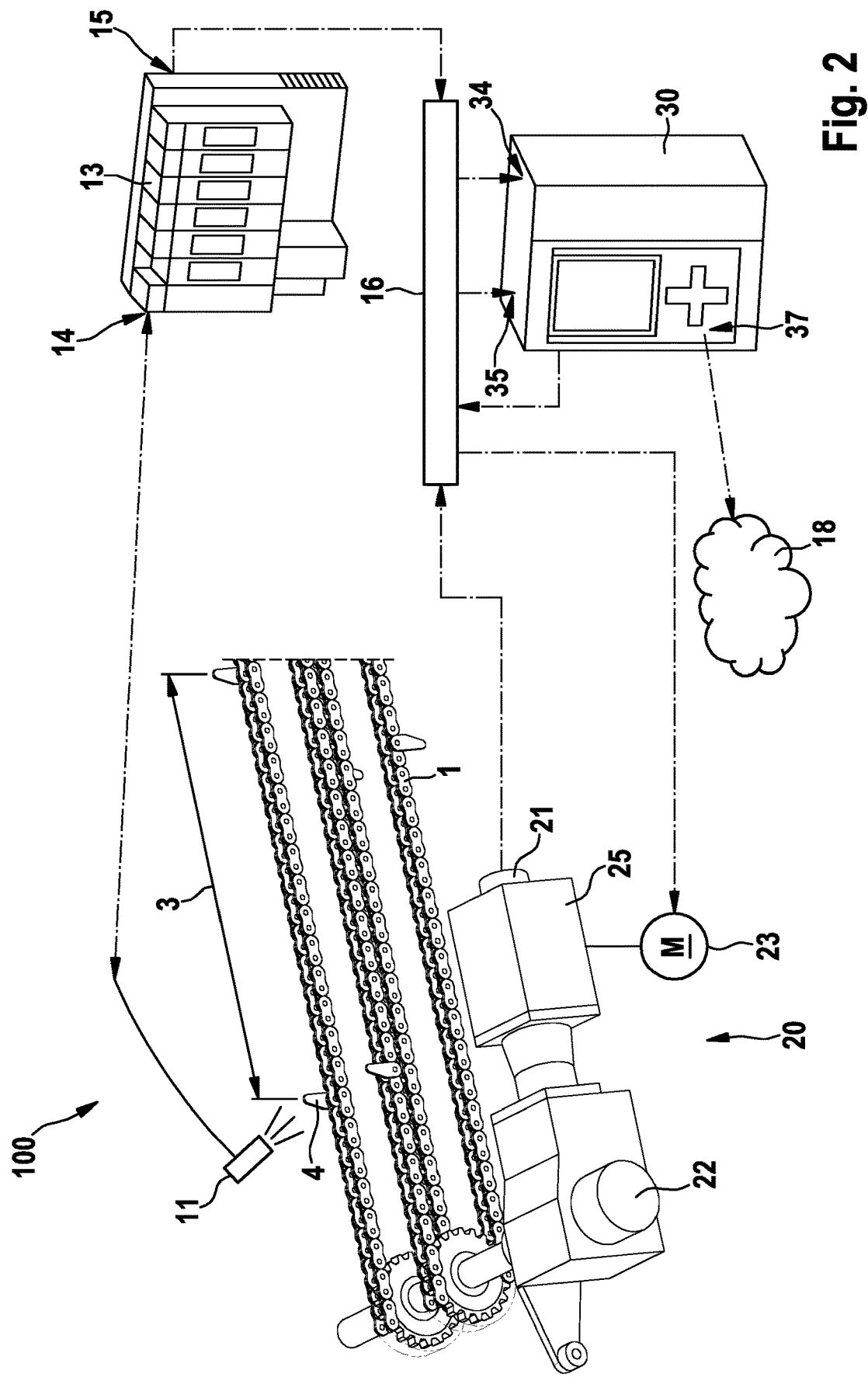
FIG. 2 a schematic representation of a transport device.

FIG. 2 shows a schematic representation of a transport device 100.

The electric drive system 20 comprises an electric motor 25, a position sensor 21, in this case an absolute encoder, a gear 22 and an actuator 23.

The transport device 100 comprises a plant control unit 30, which is synchronized with the electric drive system 20 via a clock-synchronous bus system 16. The plant control unit 30 controls the actuator 23, for example a frequency converter, and receives position data from the absolute encoder 21 via an input 35.

The transport device 100 further comprises a measuring sensor 11 for detecting the measuring marks 4 on the chain 1.

The plant control unit 30 has a first input 34 for receiving measurement data from the measuring sensor 11 and a second input 35 for receiving position data from the position sensor 21. The transport device 100 is designed to receive data from the measuring sensor 11 and from the position sensor 21, to assign them to each other in correct time and to determine therefrom lengths 3 between, in particular two consecutive measuring marks 4.

The plant control unit 30 may have a module for monitoring mechanical assemblies, for example a Simatic S7-1500.

The transport device 100 comprises a processor unit 13 for data pre-processing, which has an input 14 for data acquired by the measuring sensor 11 and an output 15 for passing the data on to the plant control unit 30, in particular by means of the clock-synchronous bus system 16.

The processor unit 13 may be a high-speed input card, for example a Simatic ET200SP.

The plant control unit 30 has at least one output 37 and is designed to forward data, in particular to a cloud 18.

Figure 3A:
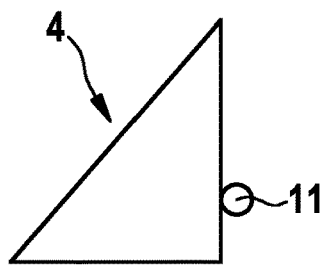
FIG. 3a a schematic representation of a carrier.
Figure 3B:
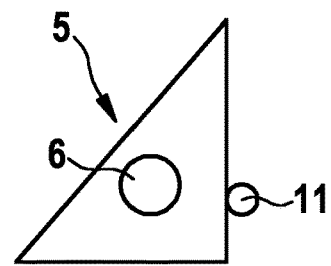
FIG. 3b a schematic representation of a reference mark.

FIG. 3a shows a schematic representation of a carrier 4 having a substantially triangular shape. FIG. 3b shows a schematic representation of a reference marker 5, which is designed as a carrier with a deviating geometric shape and has a hole 6.

Figure 3C:
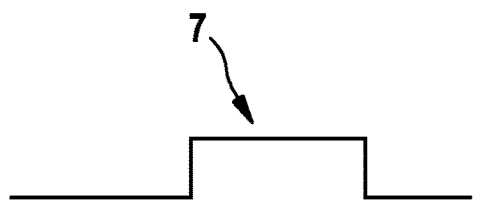
FIG. 3c a schematic representation of a measuring pattern of the carrier.
Figure 3D:
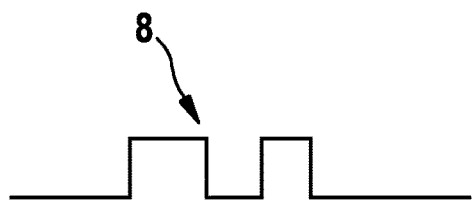
FIG. 3d a schematic representation of a measuring pattern of the reference mark.

FIG. 3c shows a schematic representation of a measurement pattern 7 generated by a carrier 4 according to FIG. 3a on an optical sensor 11. FIG. 3d shows a schematic representation of a measuring pattern 8, which generates a reference mark 6 according to FIG. 3b at the optical sensor 11.

For the length evaluation, the time at which the steep edge of the carrier 4 or the reference mark 5 passes the sensor 11 is preferably used.

Figure 4:
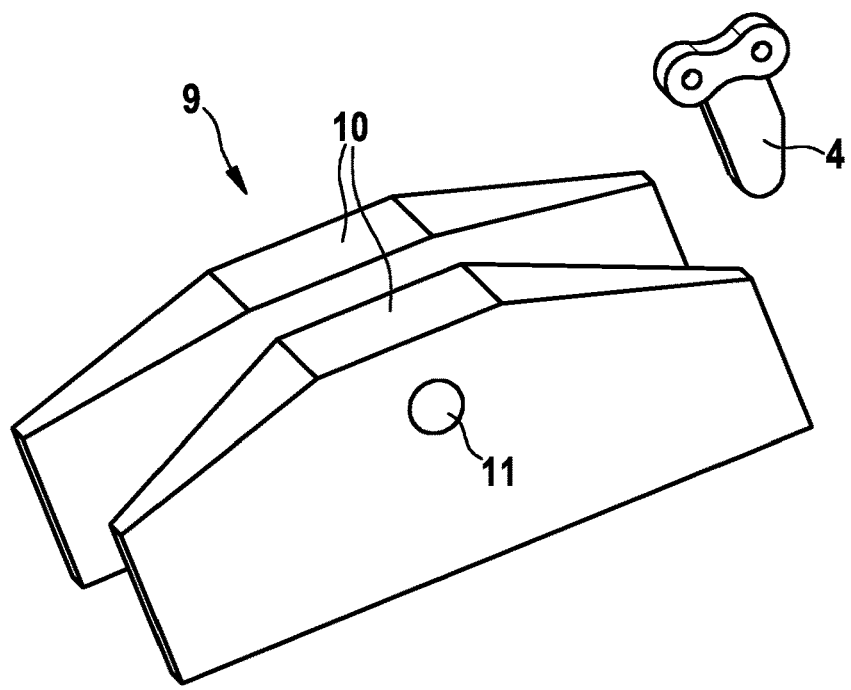
FIG. 4 a perspective view of a measuring mark guide.

FIG. 4 shows a guide rail 9 in perspective view. To ensure that the measuring marks 4 are at a defined distance from the measuring sensor 11, the measuring marks 4 are guided along between two guide jaws 10 as they pass the measuring sensor 11.

The invention claimed is:

1. A transport device, having
   a. at least one chain, to which measuring marks are attached,
   b. an electric drive system having an electric drive for driving the at least one chain, comprising a servo motor and a position sensor, the position sensor being an absolute encoder,
   c. a plant control unit,
   d. a measuring sensor for detecting the measuring marks, with a switching frequency of greater than 2000/s,
wherein
the plant control unit comprises a first input for receiving measurement data from the measuring sensor and a second input for receiving position data from the position sensor and wherein the plant control unit is designed,
   to receive the measurement data from the measuring sensor and the position data from the position sensor,
   to mutually correlate said measurement data and said position data correctly with respect to time,
   to determine therefrom lengths between the measurement marks and
   to generate a signal which provides information about the quality of the chain,
wherein the transport device comprises a processor unit for data preprocessing, which serves as an input card for the plant control unit and which has an input for the measurement data detected by the measuring sensor and an output for passing the measurement data on to the plant control unit, having an oversampling function for determining a subclock in the event of a signal change at the input, and the plant control unit being designed to allocate a servo position actual value corresponding to a position of the electric drive in the event of a signal change with temporal accuracy.

2. The transport device according to claim 1, wherein the transport device is for transporting product carriers in a plant for producing food products.

3. The transport device according to claim 1, wherein the plant control unit is designed to allocate a servo position actual value corresponding to the position of the electric drive in the event of a signal change with temporal accuracy via the following relationship:

$$P_x = (P_{t2} - P_{t1}) * (X_{pos} - 1)/\text{OVS} + P_{t1} \text{ [mm], wherein}$$

$P_x$ the servo position actual value to be determined,
$P_{t1}$ the servo position at time t1 with a bus clock,
$P_{t2}$ the servo position at time t2 at a subsequent bus clock,
$X_{pos}$ the subclock at which a signal change from 0 to 1 takes place.

4. The transport device according to claim 1, wherein the measuring sensor is an inductive or optoelectronic sensor.

5. The transport device according to claim 1, wherein the at least one chain comprises at least one reference measuring mark.

6. The transport device according to claim 5, wherein the at least one reference measuring mark has a geometry differing from the other measuring marks.

7. The transport device according to claim 1, wherein the plant control unit is designed to synchronize received data with the plant clock.

8. The transport device according to claim 1, wherein the plant control unit comprises a plant clock, and the transport device has a clock-synchronous bus system for at least one of synchronizing the plant control unit and the electrical drive system and synchronizing the plant control unit and the incoming measurement data.

9. The transport device according to claim 1, wherein the plant control unit is adapted to at least one of
   a. to store raw data,
   b. to determine measurement events from the measurement data,
   c. to determine lengths between the measurement events and
   d. to detect changes in lengths between the measurement events.

10. The transport device according to claim 1, wherein the plant control unit has at least one output and is designed to forward data.

11. The transport device according to claim 10, wherein the plant control unit is designed to forward data to at least one of a display unit and a cloud.

12. The transport device according to claim 1, wherein the electric drive system comprises an actuator with interface for data exchange with the plant control unit.

13. The transport device according to claim 12, wherein the interface is a frequency converter.

14. A plant for producing a food product comprising at least one transport device according to claim 1.

15. A method for determining lengths of segments of a chain which is driven by an electric drive in a transport device according to claim 1, wherein a measuring sensor detects measuring marks applied to the chain, comprising the steps of
assigning data detected by the measuring sensor and data transmitted by an absolute encoder of a servo motor, which drives the chain, to one another with correct timing,
determining a servo position actual value by means of over-sampling,
determining therefrom lengths between the measurement marks, and
generating a signal which provides information about the quality of the chain.

16. The method according to claim 15, wherein for determining the servo position actual value the following relation is used:

$$P_x = (P_{t2} - P_{t1}) * (X_{pos} - 1)/\text{OVS} + P_{t1} \text{ [mm], wherein}$$

$P_x$ the servo position actual value to be determined,
$P_{t1}$ the servo position at time t1 with a bus clock,
$P_{t2}$ the servo position at time t2 at a subsequent bus clock, $X_{pos}$ the subclock at which a signal change from 0 to 1 takes place.

17. The method according to claim 15, wherein at least one of
   a. raw data are stored,
   b. measurement events are determined from measurement data,
   c. lengths between the measurement events are determined and
   d. changes in lengths between the measurement events are detected.

18. The method according to one claim 15, wherein a plant control unit synchronizes measurement data detected by the measuring sensor and data transmitted by a position sensor of the electric drive by means of a clock-synchronous bus connection.

19. A computer program product comprising instructions which, when the program is executed by a computer, cause the computer to perform the steps of the method of claim 15.

\* \* \* \* \*